US012810792B2

(12) United States Patent
Ni et al.

(10) Patent No.: US 12,810,792 B2
(45) Date of Patent: Nov. 24, 2026

(54) METHOD FOR PROCESSING IMAGES WITH PIXEL MASK INSERTION AND DISPLAY SYSTEM

(71) Applicant: REALTEK SEMICONDUCTOR CORP., Hsinchu (TW)

(72) Inventors: Hua-Yi Ni, Hsinchu (TW); Yu-Pin Chou, Hsinchu (TW); Cheng-Yueh Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 19/244,815

(22) Filed: Jun. 20, 2025

(65) Prior Publication Data

US 2026/0196167 A1 Jul. 9, 2026

(30) Foreign Application Priority Data

Jan. 9, 2025 (TW) ................................ 114100812

(51) Int. Cl.
*G09G 3/3225* (2016.01)
*G06T 7/00* (2017.01)
(Continued)

(52) U.S. Cl.
CPC ............ *G09G 3/3225* (2013.01); *G06T 7/10* (2017.01); *G06T 7/215* (2017.01); *G09G 3/003* (2013.01); *G09G 3/20* (2013.01); *H04N 19/132* (2014.11); *H04N 19/176* (2014.11); *G06T 2207/10004* (2013.01); *G06T 2207/20016* (2013.01);
(Continued)

(58) Field of Classification Search
CPC ..... G09G 2320/0626; G09G 2320/046; G09G 2320/04; G09G 3/20; G09G 3/3225; G06T 2207/20021; G06T 7/215; G06T 2207/10016; G06T 5/70; G06T 7/223; H04N 19/176; H04N 19/132; H04N 19/196; H04N 19/119; H04N 19/18
See application file for complete search history.

(56) References Cited

U.S. PATENT DOCUMENTS 9,245,500 B1 * 1/2016 Zhang ...................... G09G 5/14
11,830,106 B2 * 11/2023 Schager .................... G06T 7/12
(Continued)

FOREIGN PATENT DOCUMENTS

CN 118711526 A 9/2024

*Primary Examiner* — Dismery Mercedes
(74) *Attorney, Agent, or Firm* — Li & Cai Intellectual Property (USA) Office

(57) ABSTRACT

A method and a system for processing images with pixel mask insertion are provided. The system is operated in a control circuit of a display system by firmware or a circuitry. The display system preferably adopts an organic light-emitting diode (OLED) display panel. For improving burn-in phenomenon caused by aging of the display panel, the control circuit performs the method for processing images with pixel mask insertion. In the method, the control circuit firstly receives frame images from a source, each of the frame images is divided into multiple blocks with the same or different sizes, and one or more masks with the same or different sizes are set for each of the blocks. Every mask is used to scan the block, and a color-reduction procedure is performed on the block by masking. The color-reduced frame image is outputted to the display panel.

18 Claims, 13 Drawing Sheets

(51) Int. Cl.

| | |
|---|---|
| ***G06T 7/10*** | (2017.01) |
| ***G06T 7/215*** | (2017.01) |
| ***G09G 3/00*** | (2006.01) |
| ***G09G 3/20*** | (2006.01) |
| ***H04N 19/132*** | (2014.01) |
| ***H04N 19/176*** | (2014.01) |
| *H04N 19/119* | (2014.01) |

(52) U.S. Cl.
CPC . *G09G 2320/041* (2013.01); *G09G 2320/046* (2013.01); *G09G 2320/0626* (2013.01); *H04N 19/119* (2014.11)

(56) References Cited

U.S. PATENT DOCUMENTS

2004/0230802 A1* 11/2004 Moon .................. H04N 19/467 713/176
2005/0179821 A1* 8/2005 Suga ........................ H04N 5/20 348/E5.073
2008/0063378 A1* 3/2008 Togo .................... H04N 9/8042 386/280
2008/0165107 A1* 7/2008 Yang .................... G09G 3/2022 345/89
2009/0109290 A1* 4/2009 Ye ........................ G09G 3/3611 348/155
2013/0021387 A1* 1/2013 Takahashi ............ G09G 3/3614 345/204
2017/0251210 A1* 8/2017 Dvir ..................... H04N 19/132
2018/0139443 A1* 5/2018 Park ....................... H04N 19/11
2021/0065454 A1* 3/2021 Goodrich ............ G06F 3/04883
2021/0118354 A1* 4/2021 Ahn ..................... G09G 3/2077
2021/0193048 A1* 6/2021 Lim ...................... G09G 3/3266
2022/0076634 A1* 3/2022 Yoon .................... G09G 3/3233
2022/0210442 A1* 6/2022 Yuan .................... H04N 19/136
2023/0162408 A1* 5/2023 Schager .................... G06T 7/12 345/581
2025/0201191 A1* 6/2025 Ji ......................... G09G 3/3233

* cited by examiner

METHOD FOR PROCESSING IMAGES WITH PIXEL MASK INSERTION AND DISPLAY SYSTEM

CROSS-REFERENCE TO RELATED PATENT APPLICATION

This application claims the benefit of priority to Taiwan Patent Application No. 114100812, filed on Jan. 9, 2025. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an organic light-emitting diode display panel, and more particularly to a method for processing images with pixel mask insertion and a system that applies a pixel-level mask insertion for reducing duty hour of organic light-emitting diode pixels.

BACKGROUND OF THE DISCLOSURE

With the rapid progress of panel technology, requirements for panels are getting more and more demanding. For example, a dynamic contrast ratio of the current common liquid crystal display (LCD) panel no longer meets the needs of the public. Instead of LCDs, OLED display panels that use organic light-emitting diodes (OLEDs) as an illuminant has been developed.

The OLED display panel provides relatively more advantages. For example, the display panel can display with a brightness close to a true black, a higher contrast, a faster response time, a lower power consumption, a wider viewing angle, a more accurate color performance, etc. However, even though the OLED display panel has the above-mentioned advantages, the illuminant adopting the OLEDs still faces degeneration problems due to limitations of its materials and manufacturing process. The degeneration phenomenon caused by pixel differentiation is such as image sticking or burn-in.

Currently, illumination mechanisms of the OLED can be roughly classified into fluorescence emission, phosphorescence emission, and thermally-activated delayed fluorescence. These illumination technologies generate a single-state fluorescence emission or a triplet-state phosphorescence emission by applying an external field voltage to drive electrons and electron holes to reach an illumination layer through several auxiliary layers such as a transport layer and a block layer, or applying material characteristics to make a single-state energy level close to a triple-state energy level, so that the triple state reaches the single state for fluorescence emission when the triple state receives an external energy by absorbing surrounding heat.

However, the above several illumination mechanisms may cause an interface barrier or an internal trap that results in a high internal resistance due to interface deterioration, and then cause the OLED to be degenerated. Further, according to many researches, the internal resistance of the OLED will be increased and the luminous efficiency of the OLED will be reduced if the OLED is in operation for a long time or in a high-temperature environment. Accordingly, luminous efficiency and lifetime of the OLED will be affected by heat accumulation due to a long working time and its duty hour.

Several solutions have been proposed in the conventional technologies for slowing down degeneration of the OLEDs. For example, degeneration of the OLEDs due to pixel differentiation can be reduced by applying a pixel shift technology that moves a displayed picture left, right, up and down so as to make the pixels of the OLEDs not have to work in the same environment for a long time. Further, luminance of the display panel can also be decreased for reducing loading of the OLEDs. Therefore, the lifetime of the OLEDs can be extended. Still further, the display panel adopting the OLEDs can operate in a low-power consumption mode and timely reduce the loading of the OLEDs by shortening the time of the OLEDs operating in a high loading situation. Further, the loading of the OLEDs can be timely reduced by analyzing the displayed picture for preventing the OLEDs from continuously operating under a higher loading.

A de burn-in compensation technology is another solution for slowing down degeneration of the OLEDs. An aging phenomenon can be recognized by measuring an internal resistance of each of the OLEDs or performing a luminous efficiency prediction model. For the aging situation, some compensation mechanisms, such as applying a greater external field voltage to the OLEDs, may serve to reduce pixel differentiation between the pixel and its surrounding pixels.

SUMMARY OF THE DISCLOSURE

In response to the above-referenced technical inadequacies that the conventional OLED display panel faces the problems of degeneration and low luminous efficiency after long-term operation, provided in the present disclosure is a method for processing images with pixel mask insertion and a system. For the LED display panel, pixel-level mask insertion is serves the purpose of reducing level of load for pixels of the display panel and heat accumulation, so that degeneration of the display panel can be restrained for extending a lifetime of the display panel.

In one aspect of the present disclosure, the system is operated in a control circuit of a display system via firmware or a circuitry, and the control circuit performs the method for processing images with pixel mask insertion to postpone panel aging.

In the method for processing images with pixel mask insertion, the control circuit receives frame images from a data source, and segments each of the frame images into multiple blocks with a same size or different sizes, or sets the frame image to one block. One or more masks with the same or different sizes are then set for each of the blocks. In the control circuit, the one or more masks with the same size or different sizes are applied to the blocks for scanning each of the blocks, and a color-reduction procedure is performed according to a setting of each of the masks. After that, the frame images that are processed by the color-reduction procedure are outputted.

In one aspect, the method for processing images with pixel mask insertion can be applied to a display system that utilizes an organic light-emitting diode (OLED) display panel.

Further, in the method for processing images with pixel mask insertion, a quantity and sizes of the masks applied to the blocks are determined, and a masking frequency and a moving period for each mask are set for ensuring that every pixel of each of the blocks is masked.

Further, each of the masks is used to scan multiple scan regions segmented from each of the blocks sequentially, randomly or according to a preset order, and the color-reduction procedure is performed on the multiple scan regions. The color-reduction procedure can reduce brightness of the pixels through the masks for reducing work load of the pixels, and turns the pixels being scanned by each of the masks into being black, gray or reducing their code value by a percentage.

In one further aspect, in the method for processing images with pixel mask insertion, when each of the frame images is set to one block, the block is scanned by the one or more masks with the same or different sizes for performing the color-reduction procedure, and a frame rate of the frame images can be increased before the frame images being processed by the color-reduction procedure are outputted.

Still further, in the color-reduction procedure, a static block having a static image in each of the frame images is determined and different degrees of color reduction are performed on the pixels of the static block. For the static blocks, each of the static blocks is segmented into multiple scan regions, and each of the scan regions has a larger area than the scan region segmented from the non-static block. The scan region of the static block also has a lower code value and a higher scan frequency than the scan region of the non-static block. Therefore, the display panel can be prevented from continuously operating in a fixed work load.

Furthermore, any high work load block in each of the frame images can be determined. Different degrees of color reduction can be performed on the pixels of the high work load block. The static block is segmented into multiple scan regions, each of which has a larger area, a lower code value or a higher scan frequency than the scan region of the non-static block, and uses a mask that matches a size of the scan region segmented from the static block. The display panel operating in a high work load can also be presented.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
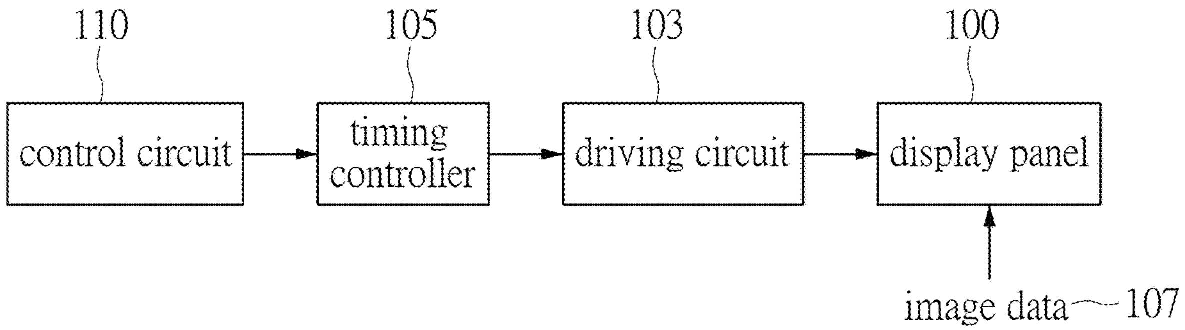
FIG. 1 is a schematic diagram depicting a display system operating a method for processing images with pixel mask insertion according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The present disclosure relates to a method for processing images with pixel mask insertion and a system. The method and the system are provided as a solution to prevent burn-in phenomenon due to degeneration of pixels of a display panel. The method can be applied to an organic light-emitting diode (OLED) display. The method for processing images with pixel mask insertion can be performed in a control circuit of a display system that adopts the OLED display panel.

A main cause of the burn-in phenomenon of the display panel (e.g., the OLED display panel) is that an internal resistance of the pixels of the display panel will increase when the display panel works for a long time or the display panel works in a high temperature environment. In addition to reduction of luminous efficiency of the display panel, the burn-in phenomenon causes degeneration of the display panel due to internal heat accumulation. One of differential degeneration phenomenon occurring to the pixels is the burn-in phenomenon. Thus, the solution provided in the present disclosure is pixel-level mask insertion that is applied to the OLED display panel. The main technical concept is to reduce a duty hour and work load of the OLED pixels. For example, heat accumulation can be decreased for effectively slowing down performance degeneration time and extending a lifetime of the OLED display panel when a work load level of the OLEDs is periodically reduced.

FIG. 1 is a schematic diagram depicting a display system that applies the method for processing images with pixel mask insertion according to one embodiment of the present disclosure.

Main circuit components of the display system shown in the diagram include a display panel 100 (e.g., an OLED display panel) and a control circuit 110 that is used to drive the display panel 100 to operate. The control circuit 110 electrically connects with a timing controller 105 and a driving circuit 103. In addition to controlling a power supply, the control circuit 110 generates a control signal to the driving circuit 103 by a timing controller 105. The driving circuit 103 is configured to drive the display panel 100 through multiple circuit lines to display images based on image data 107.

In certain embodiments, the method for processing images with pixel mask insertion can be implemented and operated in the control circuit 110 by firmware or circuits. The control circuit 110 transmits pixel-level masks to the driving circuit 103 by the timing controller 105 so as to control duty hour of pixels of the display panel 100. Aging problem (e.g., burn-in phenomenon) of the OLED display panel can be improved by reducing the work load of the panel.

Figure 2:
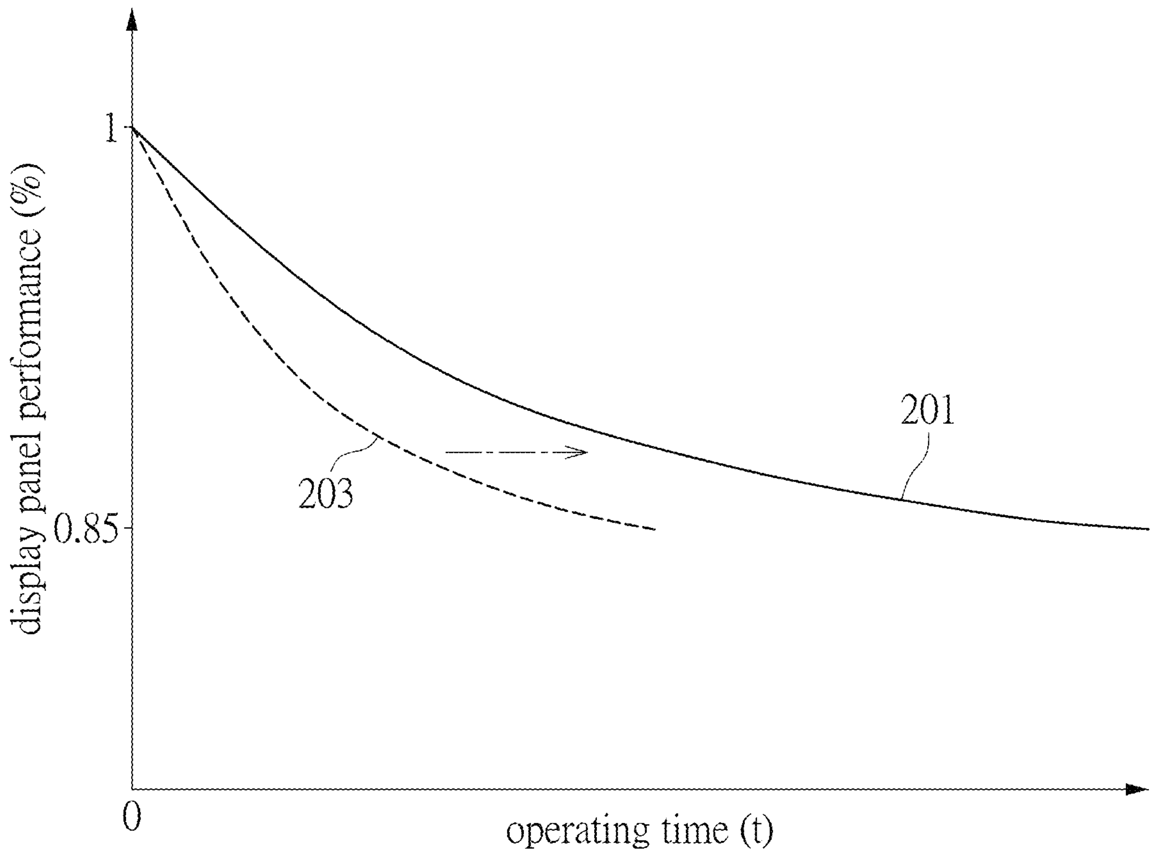
FIG. 2 is a curve diagram depicting an operating time of a display panel comparative to performance of an OLED display panel in one embodiment of the present disclosure.

Reference is made to FIG. 2, which shows a curve diagram describing an operating time of an OLED display panel relative to performance of the OLED display panel.

A curve 203 shown in the diagram depicts that the performance of a conventional OLED display panel in a vertical axis drops lower as an operating time in a horizontal axis lengthens.

However, in one of the embodiments, a pixel-level mask is designed for each of the blocks or pixels of the OLED display panel. Moving positions and time sequence of one or more masks can be self-defined, and the one or more masks can be applied to the multiple scan regions randomly or sequentially, so that the duty hour of the pixels of the OLEDs can be reduced. In an exemplary example, a driving current outputted to the pixels can be cut off regularly or irregularly, and therefore the work level of the pixels can be quasi-periodically (i.e., periodically or irregularly) decreased, and heat accumulation can also be reduced. The above solution can effectively slow down the performance degeneration time of the OLED display panel, and the lifetime of the OLED display panel can be extended as a curve 201 shown in the diagram.

Figure 3:
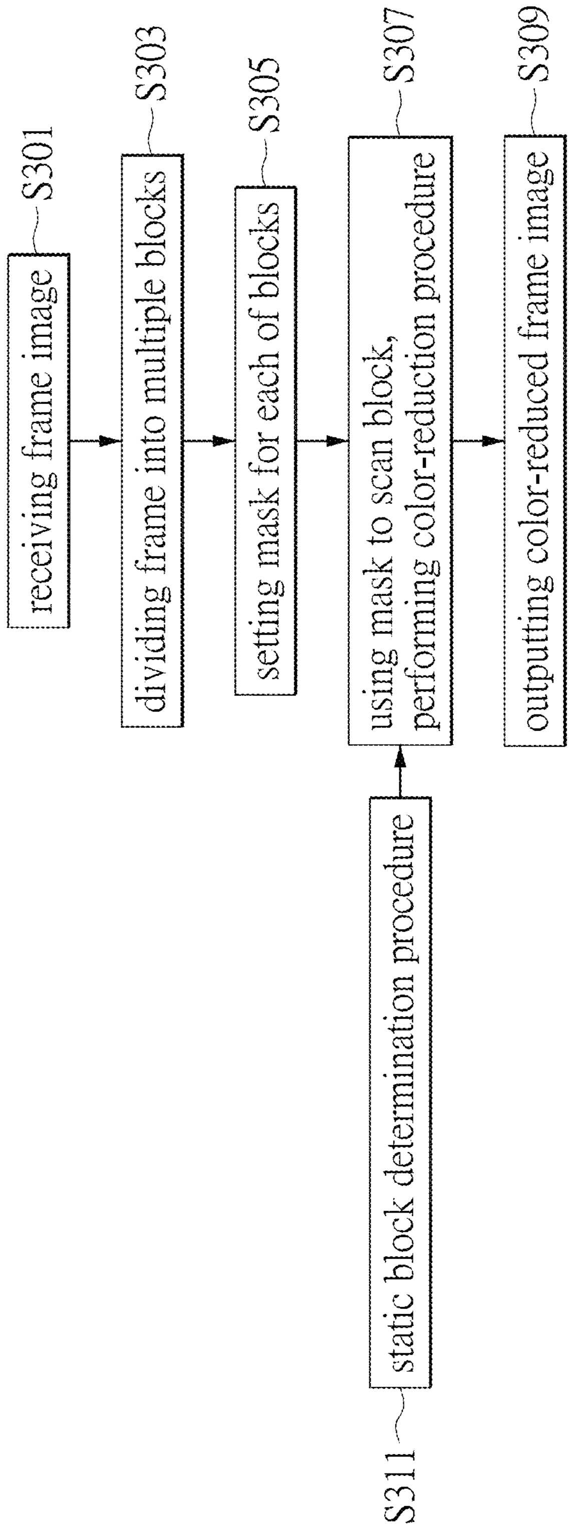
FIG. 3 is a flowchart illustrating the method for processing images with pixel mask insertion according to one embodiment of the present disclosure.

FIG. 3 is a flowchart illustrating method for processing images with pixel mask insertion operated in the control circuit of the display system according to one embodiment of the present disclosure. In the meantime, the schematic diagrams depicting pixel-level mask insertion shown in FIG. 4A to FIG. 4C and FIG. 5A to FIG. 5E are referred to according to one of the embodiments.

Referring to FIG. 3 that illustrates the flowchart according to the embodiment of the present disclosure, the control circuit receives frame images from a data source (step S301), and then segments each of the frame images into multiple blocks in a form of an array (e.g., M*N blocks) (step S303). The frame image can be regarded as one block in another aspect of the present disclosure. It is worth noting that the each of the frame images is preferably segmented into the multiple blocks. The size of each of the blocks can be adjusted as a demand by a user and a mask applied to each of the blocks is also defined (step S305). Further, a quantity and the sizes of the masks can also be self-defined. It should be noted that a quantity and sizes of the masks are determined and a moving period that is a number of times to move each of the masks is accordingly determined for ensuring that every pixel of each of the blocks is masked. Therefore, work load of the pixels of the display panel and differential pixel aging, indicating that different aging rate among pixels may result in color differences, can be reduced. When the quantity of the one or more of the same or different sizes of masks for each of the blocks is determined, a masking frequency and a moving period for each mask are set for ensuring that every pixel of each of the blocks is masked.

It should be noted that, when the method for processing images with pixel mask insertion is performed, each of the frame images is segmented into multiple blocks and a smaller mask can be used to evenly perform masking on the frame images for maintaining a same masking frequency. Further, it is advantageous to apply the smaller mask to the frame images for reducing visual impact due to large-scale changes of images.

Furthermore, if the frame image is not segmented into the multiple blocks (i.e., only one block), only one mask is applied to the whole frame image and the color reduction procedure is performed on the frame image being scanned by the mask. An operating temperature can be reduced when only one mask is applied to the frame image when the color reduction procedure is performed. However, the aging problem to the OLED display panel can be improved, but a flickering phenomenon caused by the changed images is possible to be perceived visually. Therefore, a frame rate of the outputted images should be increased for preventing the flickering phenomenon when the color reduction procedure is performed on the frame images.

One of the objectives in designing the masks is to achieve a purpose of reducing heat accumulation of the display panel by quasi-periodically reducing brightness of pixels of the display panel. For example, the masks can be periodically moved over and be applied on all of the pixels of the images displayed by on the display panel, by which the time of the degeneration (e.g., burn-in phenomenon) of the display panel can be slowed down. The certain embodiments of the present disclosure are provided for the OLED display panel to prevent the burn-in phenomenon.

Thus, the above-described masks can be used to scan multiple scan regions segmented from each of the blocks sequentially, randomly or according to a preset order and the color-reduction procedure can be performed on the multiple scan regions according to setting of the masks (step S307). After that, the frame images being processed by the color-reduction procedure are outputted (step S309). It should be noted that the color value of each of the blocks can be reduced sequentially through the masks since the color-reduction procedure turns the pixels being scanned by each of the masks into being black, gray or reducing code value by a percentage. In the process of color reduction, a proper size of the mask is designed for preventing obvious changes of the pixels in brightness. The size of the mask determines the masking frequency. Alternatively, the mask can be designed with an appropriate masking ratio for reducing a proper ratio of code values of the display panel. The code value indicates brightness or color channels such as a red channel, a green channel, a blue channel and/or a white channel.

Figure 4A:
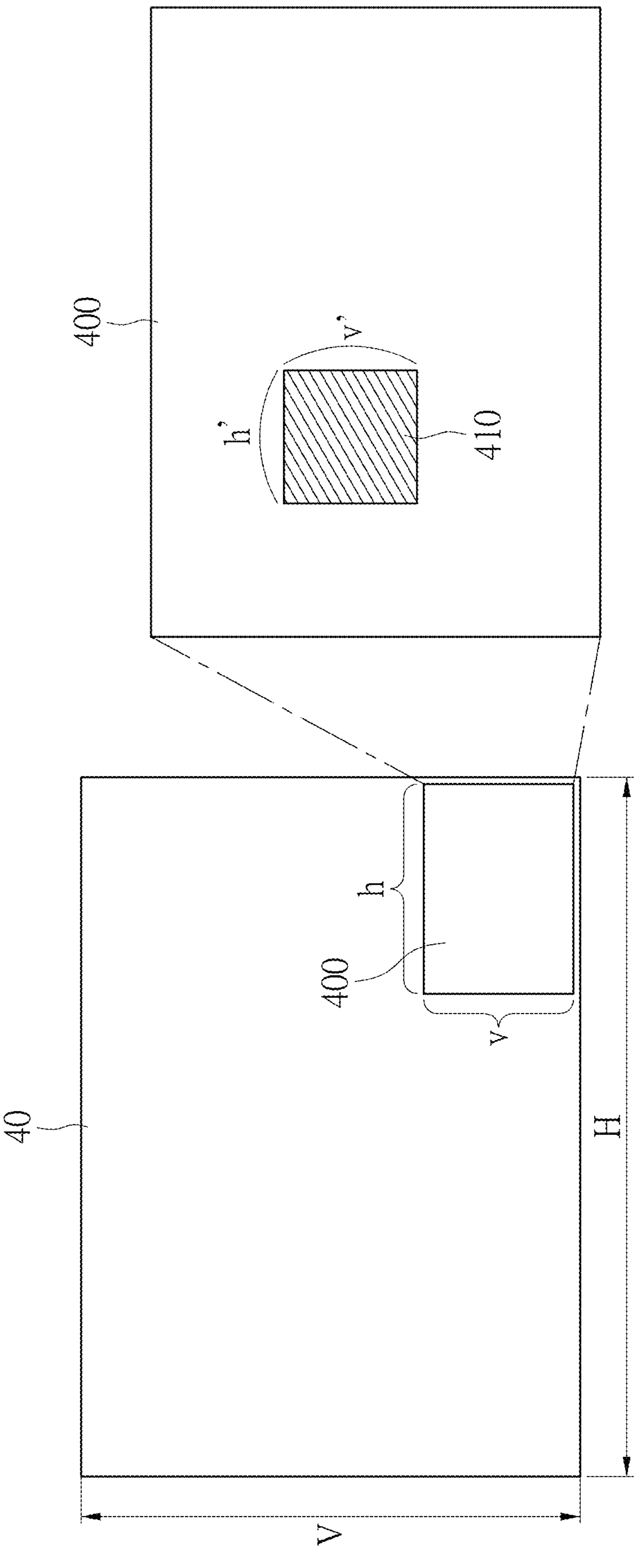
FIG. 4A to FIG. 4C are schematic diagrams depicting pixel-level mask insertion according to one embodiment of the present disclosure.
Figure 4B:
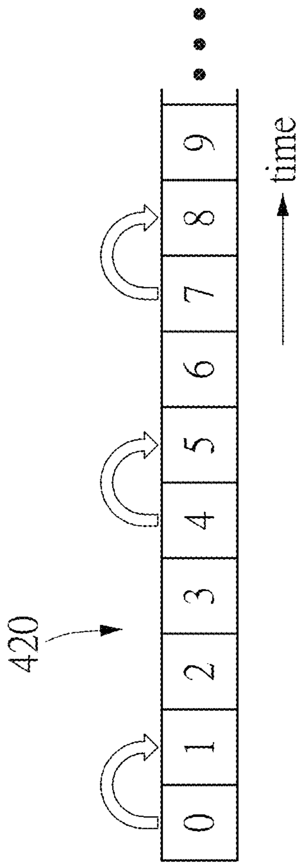
Figure 4C:
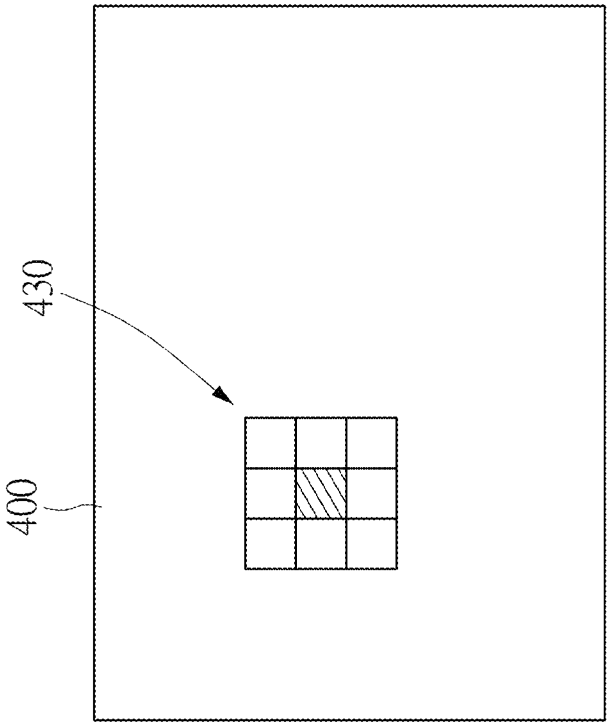

In step S305 of FIG. 3, a mask referring to the schematic diagrams shown in FIG. 4A to FIG. 4C is applied to each of the blocks according to one embodiment of the present disclosure.

A frame image 40 with a width "H" and a height "V" is schematically shown in FIG. 4A. The frame image 40 is segmented into multiple blocks (e.g., M*N blocks), in which a block 400 with a width "h" and a height "v" is taken as an example. A mask 401 with a width "h'" and a height "v'" is configured to be applied to the block 400. It should be noted that the quantity and sizes of the masks applied to the block are determined based on actual need.

After the mask 410 is determined, the mask 401 with a width "h'" and a height "v'" shown in FIG. 4A is applied to sequentially scan multiple scan regions 420 of the block 400 over time. The scan regions are exemplarily numbered from 0, 1 to 9. It should be noted that the size of each of the scan regions is the same with the mask 410. It should be noted that, when the system uses the mask 410 to scan and applies the mask 410 to the scan regions 420 according to an order of the continuous scan regions 420 in the block 400, changes in brightness of the pixels can be visually perceived. If it is required to reduce the changes in brightness being visually perceived, the mask 410 is configured to be randomly applied to all of the pixels of the multiple scan regions in the block 400, in no particular order. Alternatively, the mask 410 can still be applied to all of the pixels in an order of the scan regions set by the system beforehand. Reference is made to FIG. 4B, which is a schematic diagram showing several arrows indicating that positions of several regions of the scan regions 420 are configured to be swapped such as a $0^{th}$ region to be swapped with a $1^{st}$ region, a $4^{th}$ region to be swapped with a $5^{th}$ region, and a $7^{th}$ region to be swapped with an $8^{th}$ region. Further, a moving period of a mask configured to scan the multiple scan regions in each of the blocks is set according to the above order after the regions are swapped.

FIG. 4C is a schematic diagram showing a 3*3 array mask 430 in the block 400. A masking ratio of the mask 410 in a central region of the 3*3 array mask 430 in an original image can be calculated, by which different degrees of color values or brightness values are reduced so as to prevent unnatural noises that human eyes can easily perceive from too high color values or brightness values.

Further, the size of the mask and the corresponding masking ratio can be adjusted for optimizing the de burn-in effect. References are made to FIG. 5A to FIG. 5E, which are schematic diagrams illustrating pixel-level mask insertion in one further embodiment of the present disclosure.

Figure 5A:
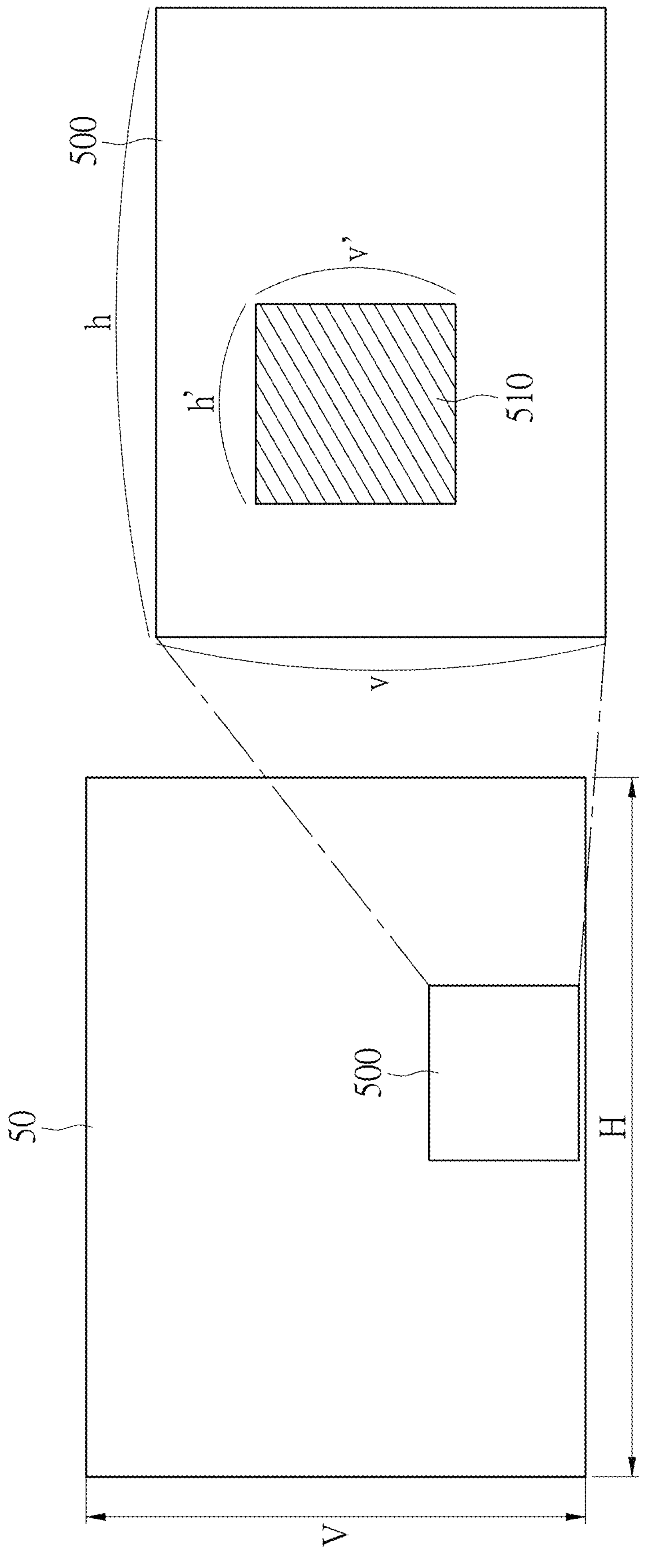
FIG. 5A to FIG. 5E are schematic diagrams depicting pixel-level mask insertion according to one further embodiment of the present disclosure.
Figure 5C:
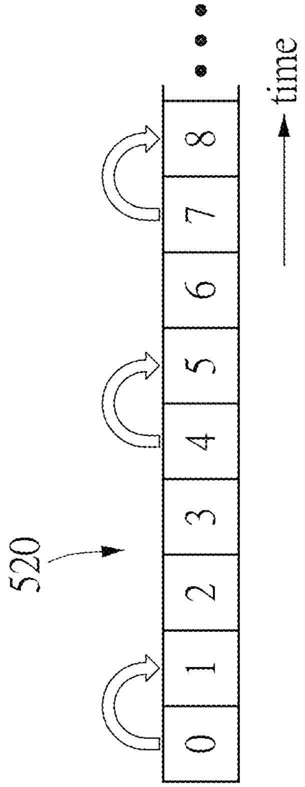

FIG. 5A shows a frame image 50 with a height "V" and a width "H" of the frame images received by the system. The frame image 50 is segmented into multiple blocks such as a block 500 with a height "v" and a width "h", and a mask 510 with a height "v'" and a width "h'" is designed for the block 500.

It should be noted that, according to one of the technical concepts of the method for processing images with pixel mask insertion, more protection measures are also performed on the pixels with high work load (i.e., the high work load block) of the display panel.

According to one of the embodiments of the present disclosure, the system is capable of conducting statistics on information of buffered images and modifying pixel values of the images. In the method for processing images with pixel mask insertion, after conducting statistics on the information of buffered images, one or more high work load blocks in each of the frame images can be determined. It should be noted that the high work load block has a very high brightness value or a very high color value, and the same block has the high work load in continuous frames. For the pixels in the one or more high work load blocks, different degrees of color reduction are performed on the pixels by the system that is capable of pixel modification. In the color reduction procedure, the one or more high work load blocks are segmented into multiple scan regions with the areas relatively larger than the scan regions of other blocks. Further, the masks with lower code values are also provided. Still further, the areas of the masks can also be raised for increasing the masking frequency that applies to scan frequencies of the masks. For example, the area of the mask 510 shown in the diagram occupies a larger ratio area of the block 500 applying the mask 510.

Figure 5B:
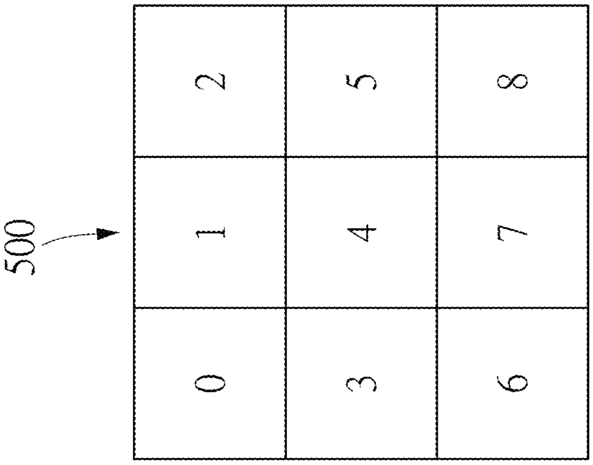

FIG. 5B shows that the block 500 is segmented into multiple scan regions in view of the mask that originally has a smaller area. The block 500 shown in the diagram includes the scan regions numbered 0 to 8. Next, in FIG. 5C, the block 500 has a smaller area mask that is used to consecutively scan the scan regions 520 over time. Similarly, when the mask is applied to scan the scan regions in an order of numbers of the scan regions, the changes of brightness can be perceived visually, and therefore the mask can be applied to the multiple scan regions of the block 500 randomly and in no particular order. For example, in the scan regions 520, the arrows shown in the diagram indicate that a $0^{th}$ region is swapped with a $1^{st}$ region, a $4^{th}$ region is swapped with a $5^{th}$ region, and a $7^{th}$ region is swapped with an $8^{th}$ region.

Figure 5E:
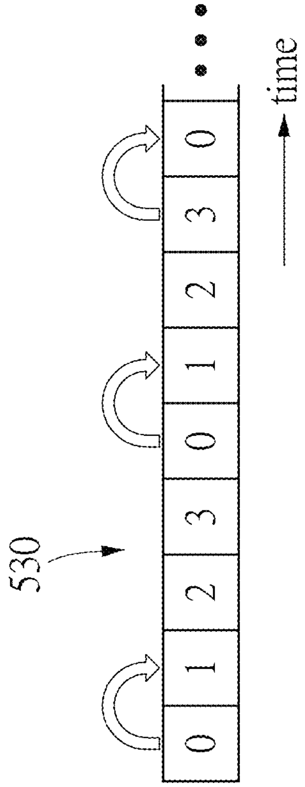
Figure 5D:
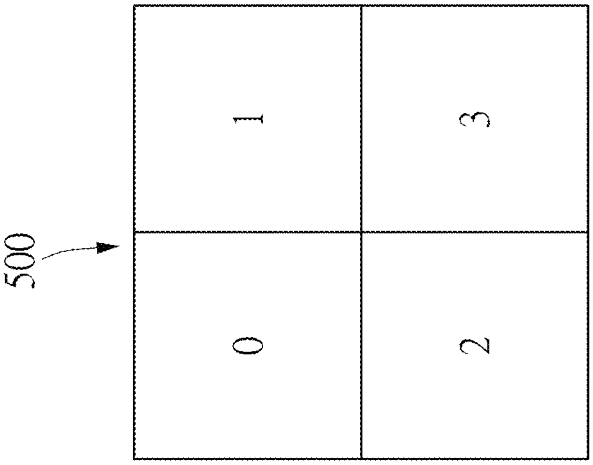

One of the above-described measures of the de burn-in is to increase the masking frequency, in which, as shown in FIG. 5D, a larger area mask 510 shown in FIG. 5A is adopted, and therefore the block 500 is segmented into the scan regions with larger areas. For example, the scan regions shown in the diagram are numbered 0 to 3.

The masking frequency is relatively increased when the larger area mask 510 is used. Reference is made to FIG. 5E, which shows continuous scan regions 530 to be scanned over time. The scan regions 530 are scanned in sequence, which means that the $0^{th}$ region, the $1^{st}$ region, the $2^{nd}$ region and the $3^{rd}$ region are continuously scanned. According to one embodiment of the present disclosure, the mask 510 can be applied to all of the pixels of each of the scan regions randomly and in no particular order. For example, the arrows shown in the diagram indicate that the $0^{th}$ region is swapped with the $1^{st}$ region and the $3^{rd}$ region is swapped with $0^{th}$ region of the scan regions 530. However, the example shown in the diagram is not used to limit the scope of the present disclosure.

In certain embodiments of the present disclosure, when the pixel-level mask insertion described above are used for performing the color-reduction procedure described in step S307 of FIG. 3, one or more static blocks having a static image in the frame images can also be determined (step S311). Different degrees of color reduction can also be performed on each of the static blocks for optimizing the de burn-in approach applied to the display panel. Lastly, the control circuit outputs the color-reduced frame images to the display panel (step S309), which is mainly the OLED display panel.

Figure 6:
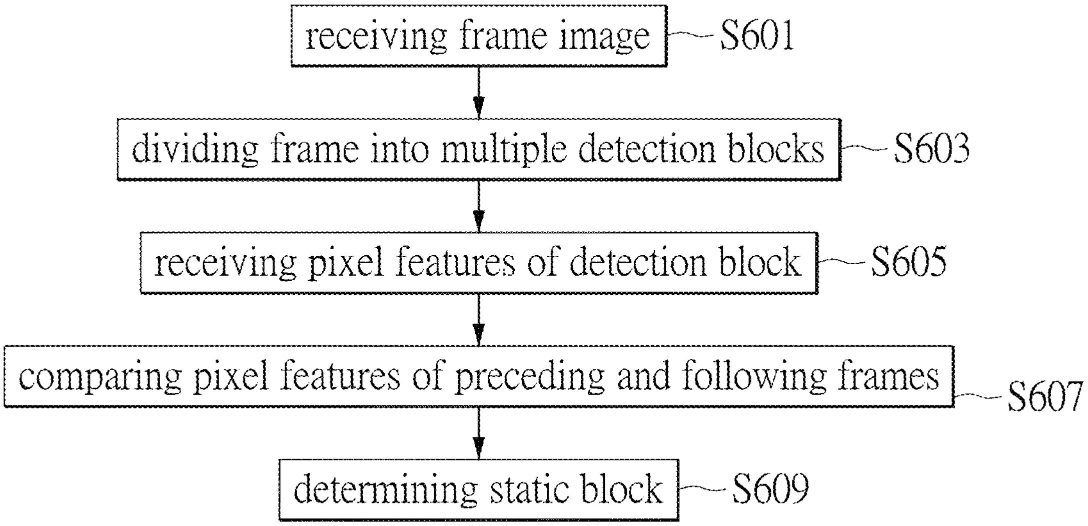
FIG. 6 is a flowchart illustrating a process of detecting a static image in the method for processing images with pixel mask insertion according to one embodiment of the present disclosure.

Reference is made to FIG. 6, which is a flowchart with reference to step S311 of FIG. 3, illustrating an exemplary process of detecting a static image existing in a static block in each of the frame images.

In the process of detecting the static image, frame images are obtained (step S601). One of the frame images is segmented into multiple detection blocks (step S603), and an image-processing technology is used to retrieve pixel features of each of the detection blocks; for example, color channel values of each of the pixels in each of the detection blocks are obtained (step S605). The pixel features of the preceding and following frame images are compared (step S607), and the changes of pixel features of the frame image can be obtained and used to determine whether any static block exists (step S609). If any static block is determined to exist, different degrees of color reduction are performed on all of the pixels of the static block.

References are made to FIG. 7A to FIG. 7E, which illustrate pixel-level mask insertion performed on the static block with respect to the color reduction measure according to one embodiment of the present disclosure.

Figure 7A:
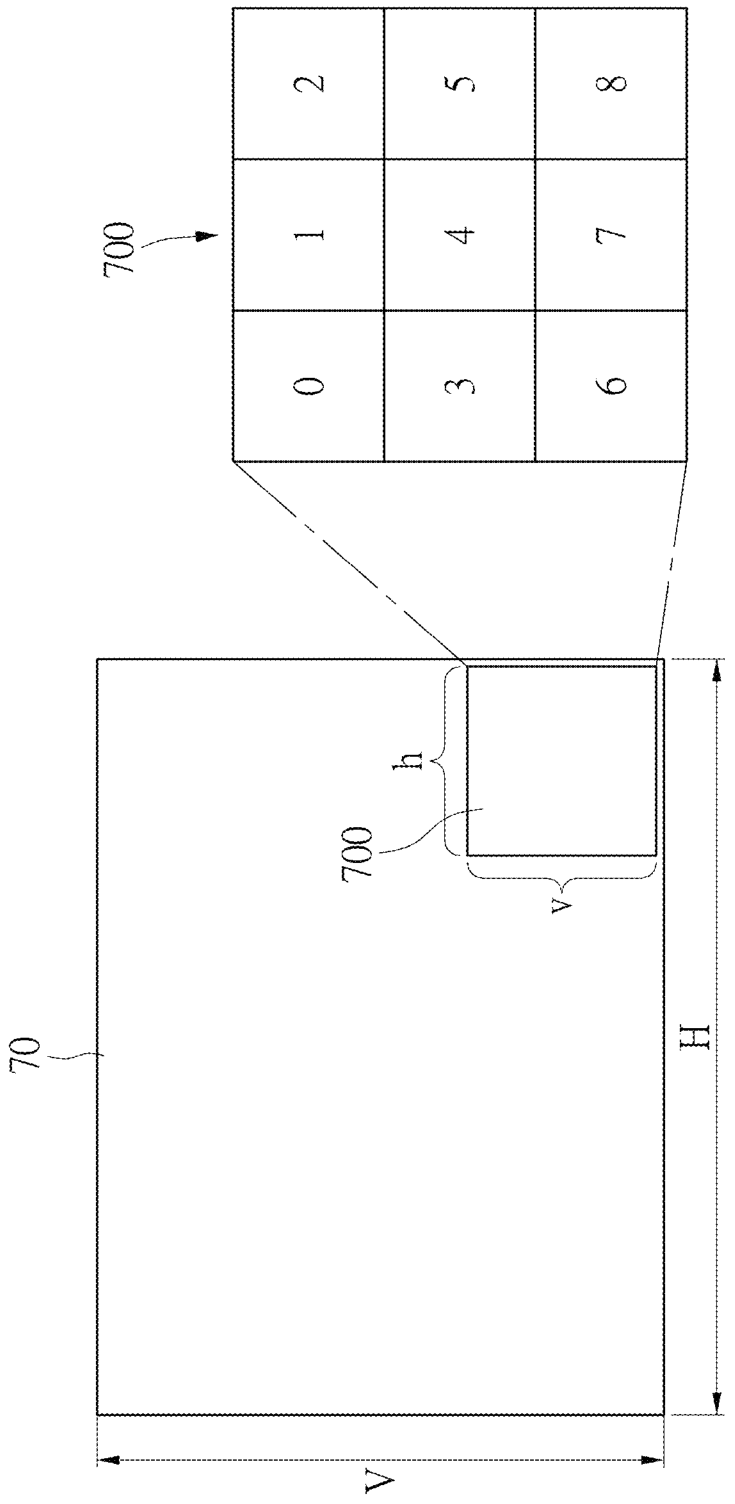
FIG. 7A to FIG. 7E are schematic diagrams depicting pixel-level mask insertion according one more embodiment of the present disclosure.

FIG. 7A shows a frame image 70 with a height "V" and a width "H." In the frame image 70, a block 700 having a static image with a height "v" and a width "h" is determined by the process described in FIG. 6. The block 700 is segmented into multiple scan regions numbered 0 to 8.

Figure 7B:
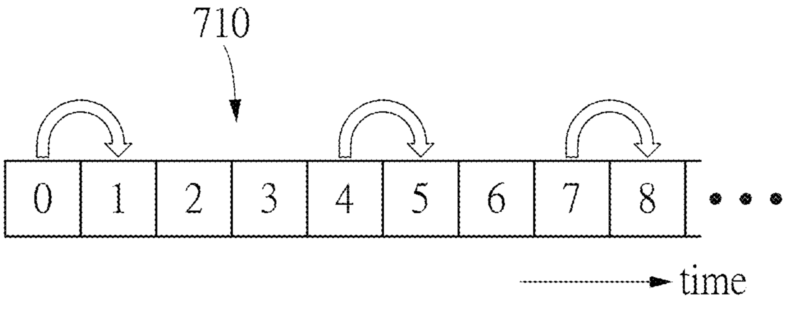

FIG. 7B shows a series of scan regions 710, including the scan regions numbered 0 to 8, that are scanned over time in the block 700. In one embodiment of the present disclosure, a mask is applied to scan pixels in each of the scan regions randomly or in no particular order. For example, the arrows shown in the diagram indicate that a $0^{th}$ region is swapped with $1^{st}$ region, a $4^{th}$ region is swapped with a $5^{th}$ region, and a $7^{th}$ region is swapped with an $8^{th}$ region in the scan regions 710. However, the example shown in the diagram is not used to limit the scope of the present disclosure.

Figure 7C:
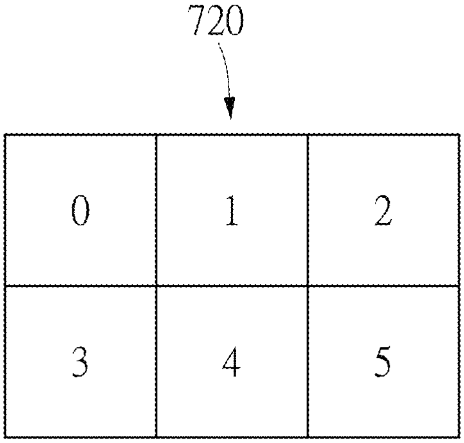
Figure 7D:
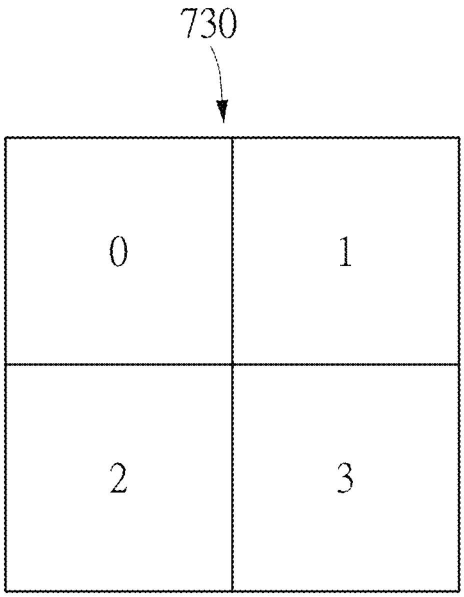

Further, the mask can be performed on the static image in the frame image 70 more accurately. The static image is such as a fixed logo image in dynamic images. For example, a block 720 shown in FIG. 7C is segmented into multiple scan regions numbered 0 to 5, so that a corresponding mask is applied to pixels of the scan regions numbered 0 to 5 in the block 720.

In order to further increase a masking frequency of the block having a static image, the block can be segmented into multiple larger scan regions (such as the scan regions numbered 0 to 3 of a block 730 of FIG. 7D) than the scan regions of other non-static block having no static image. The scan regions numbered 0 to 3 can be expressed as a series of scan regions 740 of FIG. 7E. A corresponding mask is applied to scan the scan regions 740 numbered 0 to 3 shown in FIG. 7E over time. The mask applied to the static block can have the same size matching one of the scan regions segmented from the static block. In another embodiment of the present disclosure, a lower code value and a higher scan frequency of the scan regions can be used for the static block other than the non-static blocks for effectively presenting the panel pixels from maintaining a fixed work load for a long time.

Figure 7E:
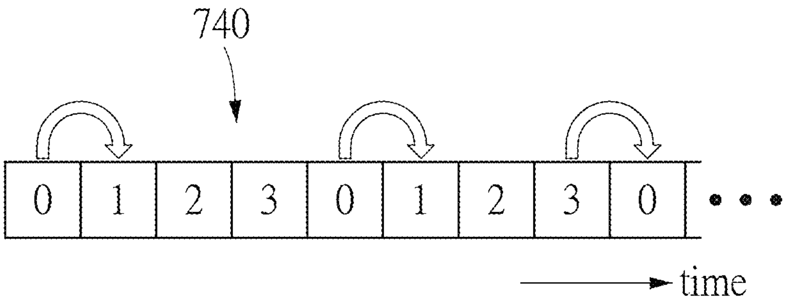

The mask can be applied to scan all of the pixels of each of the scan regions randomly and in no particular order. For example, as shown in the diagram of FIG. 7E, the arrows indicate that a $0^{th}$ region is swapped with a $1^{st}$ region and a $3^{rd}$ region is swapped with $0^{th}$ region of the scan regions 740. However, the example shown in the diagram is not used to limit the scope of the present disclosure.

In one more embodiment of the method for processing images with pixel mask insertion of the present disclosure, in addition to the embodiments that the frame image is segmented into multiple blocks in relatively consistent sizes or not segmented into the blocks, the method of the present disclosure can also support that one or more of the same or different sizes of masks are frame-by-frame performed on one or more of the same or different sizes of blocks at the same time (e.g., processing in parallel). The color-reduction procedure is performed on each of the blocks through the same or different sizes of masks.

Figure 8:
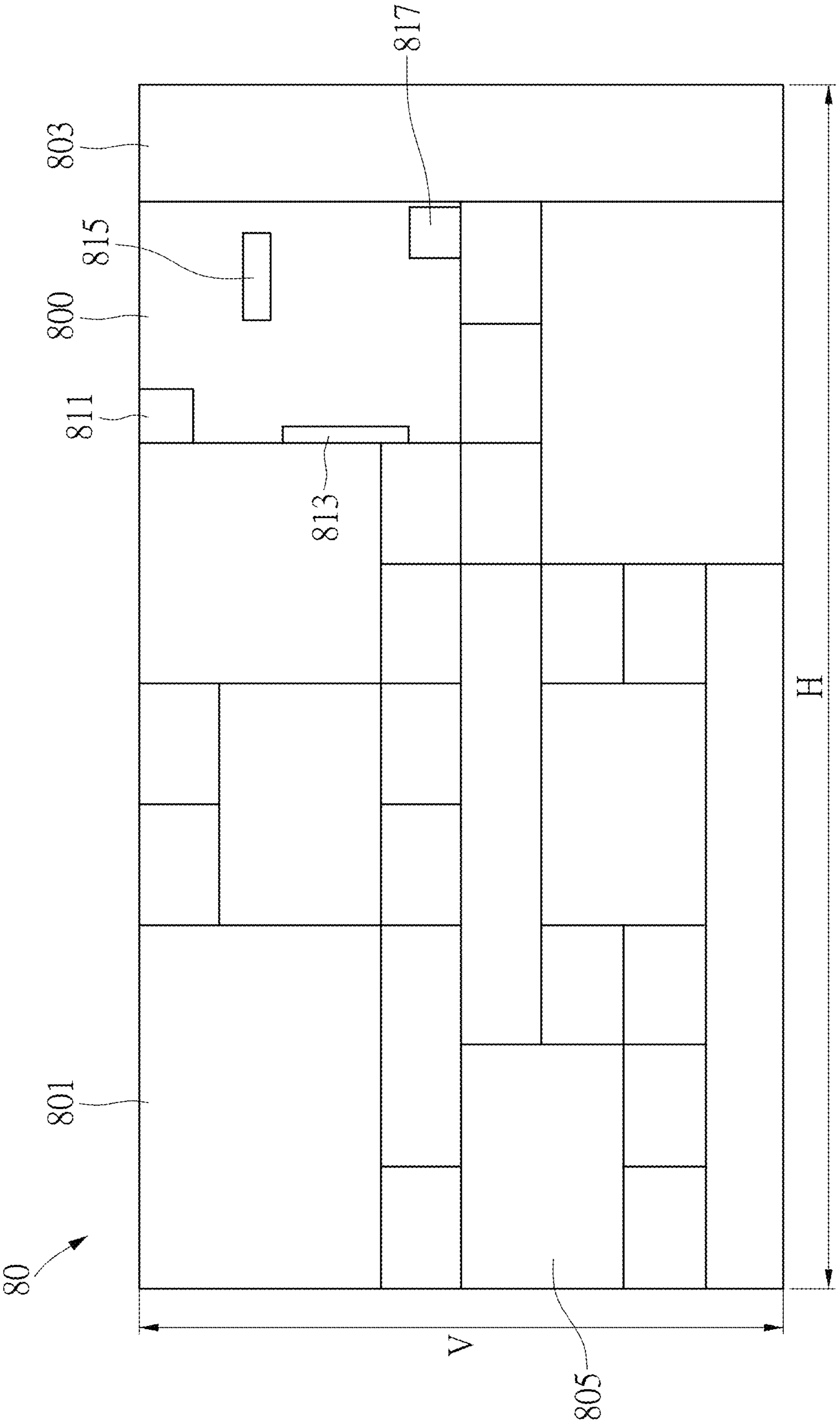
FIG. 8 is a schematic diagram depicting a pixel-level mask insertion in one embodiment of the present disclosure.

Reference is made to FIG. 8, which is a schematic diagram depicting the pixel-level masks to be inserted according to one embodiment of the present disclosure.

FIG. 8 shows a frame image 80 with a height "V" and a width "H." The frame image 80 shown in the diagram is segmented into multiple blocks in different sizes, which are schematically the blocks numbered 800, 801, 803 and 805. A mask is applied to each of the blocks, or multiple masks in the same or different sizes are applied to each of the blocks. The exemplary example shown in the diagram shows multiple sizes of masks 811, 813, 815 and 817 in the block 800.

When the system operates the method for processing images with pixel mask insertion, the system stores a table in a memory, in which the memory records one or more blocks being segmented from each of the frames and the sizes of the blocks, and one or more masks applied to the one or more blocks and the sizes of the one or more masks. The system relies on this table to determine a masking frequency and a moving period of each of the masks when the system is in operation so as to ensure that every pixel in each of the blocks is masked and scanned in each of the duty cycles, and to perform the same number of times of the color-reduction procedure.

In conclusion of the above embodiments of the method for processing images with pixel mask insertion and the system of the present disclosure, the size of masks applied to the blocks segmented from each of the frame images can be fixed or dynamically adjusted in response to the pixel features (e.g., brightness, red, green, blue or while channel values) of each of the blocks. Position and time sequence of the mask can be self-defined. Moreover, for the blocks with a higher brightness or a static image, a larger area of mask can be applied for increasing a masking frequency and performing a pixel-level color-reduction procedure. The mask can be black or gray. The pixel features of the blocks are referred to for adjusting a ratio for the color reduction procedure. Different masks can be applied to the blocks having a static block, and the color-reduction procedure is performed thereon in different masking frequencies. In one aspect, a larger area of the mask can be applied to the static block in a higher masking frequency.

It is worth noting that, when the color-reduction procedure is performed on the red, green, blue and white channels of the pixels respectively in each of the scan regions where the mask is applied, the red, green, blue and white channel values can be decreased together for avoiding color shift. Furthermore, in order to optimize the de burn-in phenomenon, the red, green, blue and white channel values can be decreased in different ratios.

Thus, through the pixel-level masks in the method for processing images with pixel mask insertion, the duty hours of the pixels formed of the OLEDs in the display panel can be reduced, and the work levels of the pixels can also be decreased quasi-periodically for reducing heat accumulation. Therefore, degeneration phenomenon of the OLED display panel can be slowed down. In addition to preventing burn-in phenomenon, and the lifetime of the OLED display panel can be lengthened.

When the method for processing images with pixel mask insertion has been implemented, efficiency of the method can be verified. For example, a displayed picture is captured many times for obtaining multiple images and recording changes of frame rates of the images. These images are cross-compared with the original images that are not processed with pixel mask insertion so as to determine whether or not the outputted images applying the pixel-level masks (e.g., a 1*1 pixel mask to a mask with a size of an entire display panel) are matched with the original images. Accordingly, the applicability of the method is verified.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for processing images with pixel mask insertion, which is performed by a control circuit of a display system, comprising:

receiving frame images from a data source;

segmenting each of the frame images into multiple blocks with a same size or different sizes, or setting the frame image to one block;

setting one or more masks with a same size or different sizes for each of the blocks;

setting a masking frequency and a moving period for each mask for ensuring that every pixel in each of the blocks is masked;

applying the one or more masks with the same size or different sizes for scanning each of the blocks, and performing a color-reduction procedure on each of the scanned blocks according to a setting of each of the masks; and outputting the frame images being processed by the color-reduction procedure.

2. The method according to claim 1, wherein each of the masks is used to scan multiple scan regions segmented from each of the blocks sequentially, randomly or according to a preset order, and the color-reduction procedure is performed on the multiple scan regions.

3. The method according to claim 2, wherein the color-reduction procedure reduces brightness of pixels through each of the masks, and makes the pixels being scanned by each of the masks turn black or gray, or reduces code value of a display panel by a percentage.

4. The method according to claim 1, wherein the display system includes an OLED display panel and the control circuit performs the method for processing images with pixel mask insertion on the images displayed on the OLED display panel.

5. The method according to claim 1, wherein, when each of the frame images is set to one block, the block is scanned by the one or more masks with the same or different sizes for performing the color-reduction procedure, and a frame rate of the frame images can be increased before the frame images being processed by the color-reduction procedure are outputted.

6. The method according to claim 1, wherein, in the color-reduction procedure, a static block having a static image in each of the frame images is determined, and different degrees of color reduction are performed on the pixels of the static block.

7. The method according to claim 6, wherein the static block is determined by steps comprising:

receiving the frame images;

segmenting each of the frame images into multiple detection blocks;

extracting pixel features of each of the detection blocks; and comparing pixel features of preceding and following frame images, and determining the static block having the static image according to changes of the pixel features of the frame images.

8. The method according to claim 7, wherein the static block is segmented into multiple scan regions, each of which has a larger area, a lower code value, or a higher scan frequency than the scan region of non-static block, and uses a mask that matches a size of the scan region segmented from the static block.

9. The method according to claim 1, wherein one or more high work load blocks of each of the frame images are determined, and different degrees of color reduction are performed on pixels of the one or more high work load blocks; and, the one or more high work load blocks are segmented into multiple scan regions, each of which has a larger area, a lower code value and/or a higher scan frequency than the scan region of other blocks.

10. A display system, comprising:

a control circuit, used to process images with pixel mask insertion by steps of:

receiving frame images from a data source;

segmenting each of the frame images into multiple blocks with a same size or different sizes or setting the frame image to one block, and setting one or more masks with a same size or different sizes for each of the blocks;

setting a masking frequency and a moving period for each mask for ensuring that every pixel in each of the blocks is masked;

applying the one or more masks with the same size or different sizes for scanning each of the blocks, and performing a color-reduction procedure on each of the scanned blocks according to a setting of each of the masks; and outputting the frame images being processed by the color-reduction procedure to a display panel.

11. The display system according to claim 10, wherein the display system includes an OLED display panel, and the control circuit performs the method for processing images with pixel mask insertion on the images displayed on the OLED display panel.

12. The display system according to claim 10, wherein, in the method for processing images with pixel mask insertion, each of the masks is used to scan multiple scan regions segmented from each of the blocks sequentially, randomly or according to a preset order, and the color-reduction procedure is performed on the multiple scan regions.

13. The display system according to claim 12, wherein the color-reduction procedure reduces brightness of pixels through each of the masks, and makes the pixels being scanned by each of the masks turn black or gray, or reduces code value of the display panel by a percentage.

14. The display system according to claim 10, wherein, in the method for processing images with pixel mask insertion, when each of the frame images is set to one block, the block is scanned by the one or more masks with the same or different sizes for performing the color-reduction procedure, and a frame rate of the frame images can be increased before the frame images being processed by the color-reduction procedure are outputted.

15. The display system according to claim 10, wherein, in the color-reduction procedure, a static block having a static image in each of the frame images is determined, and different degrees of color reduction are performed on the pixels of the static block.

16. The display system according to claim 15, wherein the static block is determined by steps comprising:

receiving the frame images;

segmenting each of the frame images into multiple detection blocks;

extracting pixel features of each of the detection blocks; and comparing pixel features of preceding and following frame images, and determining the static block having the static image according to changes of the pixel features of the frame images.

17. The display system according to claim 16, wherein the static block is segmented into multiple scan regions, each of which has a larger area, a lower code value or a higher scan frequency than the scan region of non-static block, and uses a mask that matches a size of the scan region segmented from the static block.

18. The display system according to claim 10, wherein one or more high work load blocks of each of the frame images are determined, and different degrees of color reduction are performed on pixels of the one or more high work load blocks; and, the one or more high work load blocks are segmented into multiple scan regions, each of which has a larger area, a lower code value and/or a higher scan frequency than the scan region of other blocks.

* * * * *